L. E. WATERMAN.
CORN PLANTER.
APPLICATION FILED JULY 16, 1910.

1,025,769.

Patented May 7, 1912.
2 SHEETS—SHEET 1.

L. E. WATERMAN.
CORN PLANTER.
APPLICATION FILED JULY 16, 1910.
1,025,769.
Patented May 7, 1912.
2 SHEETS—SHEET 2.
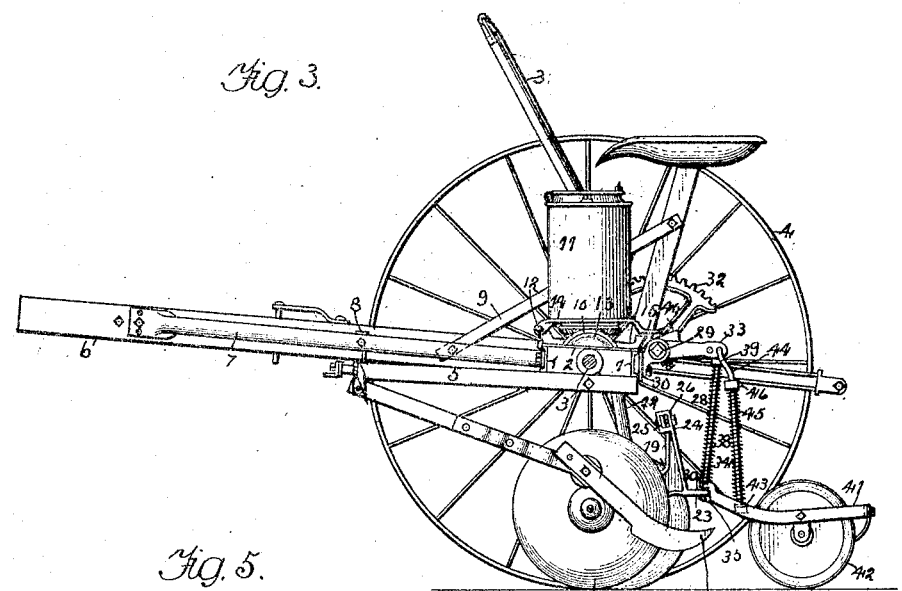
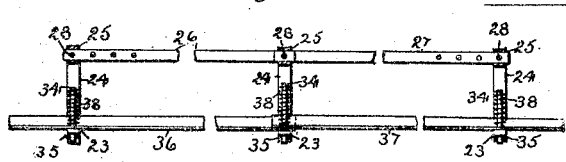
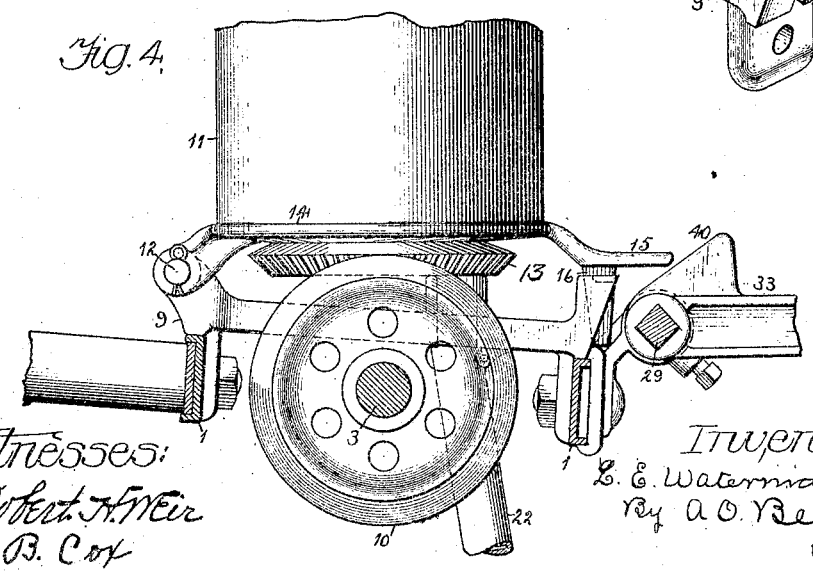
Witnesses:
Robert H Weir
B. B. Cox
Inventor:
L. E. Waterman
By A O Behel
Atty.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

CORN-PLANTER.

1,025,769.  Specification of Letters Patent.  Patented May 7, 1912.

Application filed July 16, 1910. Serial No. 572,396.

*To all whom it may concern:*

Be it known that I, LEWIS E. WATERMAN, a citizen of the United States, residing at Rockford, in the county of Winnebago and State of Illinois, have invented certain new and useful Improvements in Corn-Planters, of which the following is a specification.

The object of this invention is to construct a corn planter in which three rows of corn can be planted at a time, and in which the three planting attachments and covering devices are movable vertically and independently of one another.

Figure 1:
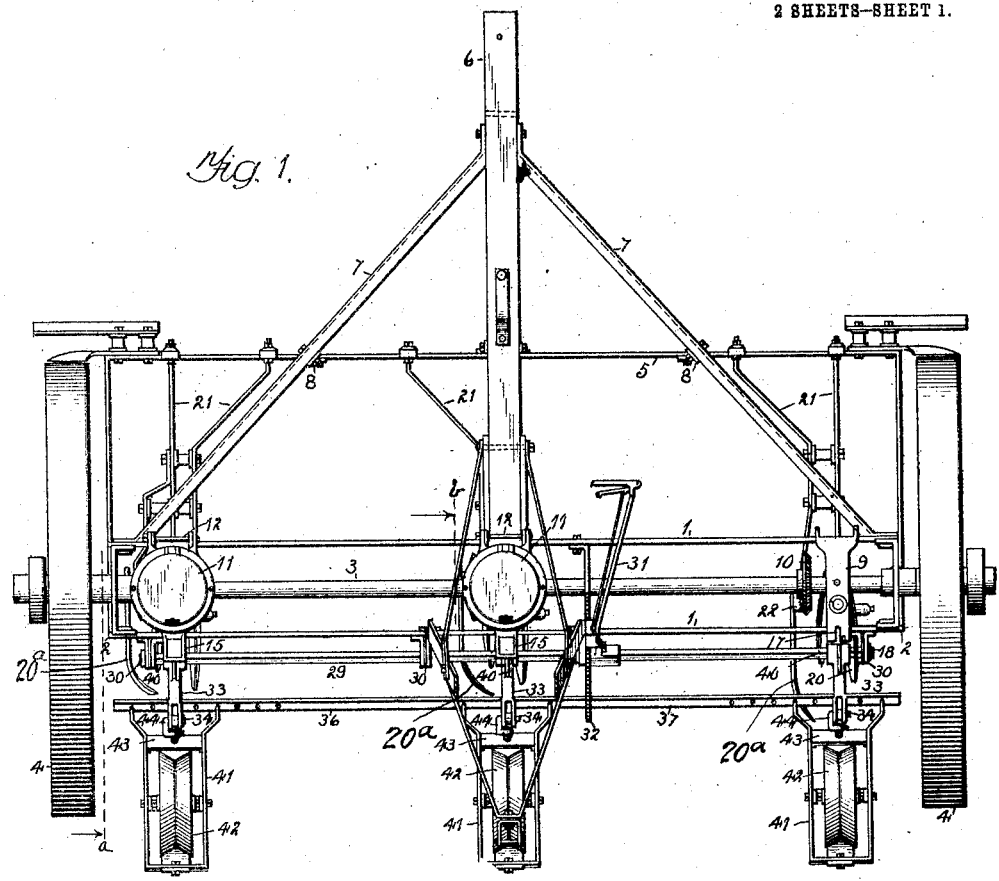
Figure 2:
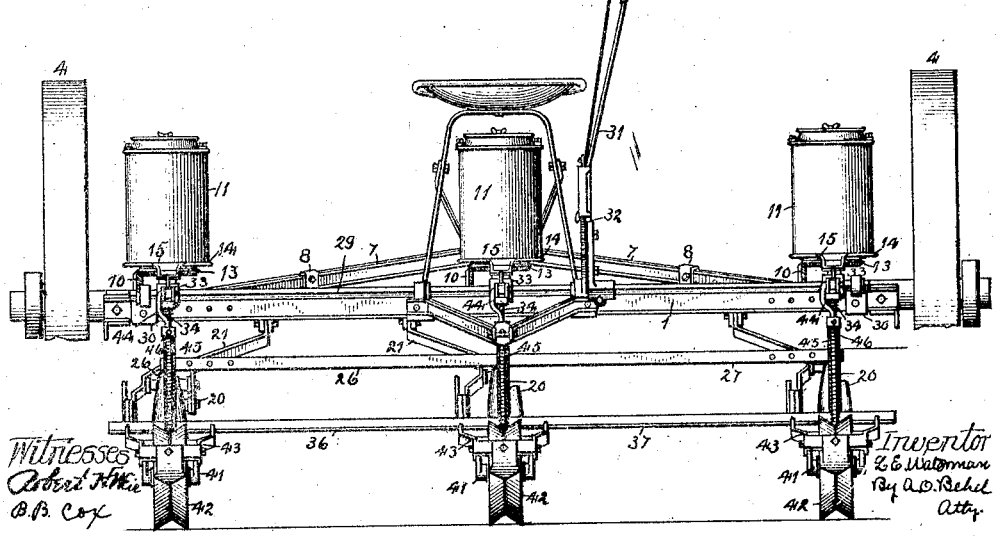

In the accompanying drawings, Figure 1 is a plan view of my improved planter. Fig. 2 is a rear elevation. Fig. 3 is a vertical section on dotted line *a* Fig. 1. Fig. 4 is a section on dotted line *b* Fig. 1. Fig. 5 is a rear elevation of the link connection between the three planting attachments. Fig. 6 is a perspective view of the rest for the seed box when held out of operative position.

The main frame comprises the two bars 1 connected by the end bars 2. An axle 3 supports the main frame by bearings in the end bars 2, and wheels 4 support the axle 3. A forward section 5 of the main frame is secured to the end bars 2 and a tongue 6 is secured to one of the bars 1 and to the section 5. Brace bars 7 have their forward ends secured to the tongue, and their rear ends are secured to one of the bars 1, and clamps 8 connect these brace bars with the section 5. Brackets 9, three in number, are bolted to the two bars 1, and extend between said bars and over the axle 3. Three bevel gears 10 are secured to the axle in a manner to be rotated thereby. Seed boxes 11 are pivotally connected to the forward ends of the brackets 9 on the rods 12, and the bevel gears 10 mesh with bevel gears 13 supported by the seed boxes, and which operate the seed dropping devices supported by the seed boxes and which are well known, and further explanation is not deemed necessary.

From the rear portion of the lower plate 14 of the seed box extends a horizontal projection 15 and from the underface of this projection extends a finger 16. The rear portion of the bracket 9 is formed with a vertical slot 17 which receives the finger 16, thereby preventing lateral movement of the rear portion of the seed box. The seed box can be tipped forward on the rod 12 as a pivot, thereby disengaging the bevel gear 13 from the bevel gear 10, and stopping the operation of the seed dropping mechanism. The seed box can be held in this tipped position by the finger 16 being moved free of the slot 17 and seated in the recess 18 formed in the rear portion of the bracket 9 and adjacent to the slot 17. A bracket 19, one for each seed dropping mechanism is located beneath a seed box, and supports furrow opener disks 20. Scrapers 20$^a$ extend alongside and behind the disks 20. Two brace bars 21 are fixedly connected to a bracket and are pivotally connected to the section 5, in order that the opener disks may move vertically. A seed spout 22 is supported by the bracket 19 and the bracket 19 has a slidable engagement with the lower portion of the tube. This bracket 19 has a rearward extension 23, and an upwardly extending arm 24 provided with a rectangular opening 25. Two bars 26 and 27 are located in the openings 25 and held in place by bolts 28 in a pivotal manner. The two bars 26 and 27 are connected together in a pivotal manner in the arm forming part of the bracket of the center seed dropping mechanism.

A square rod 29 is supported in brackets 30 connected to one of the bars 1, and to this rod is fixedly connected a hand-lever 31. A toothed segment 32 is fixedly connected to one of the bars 1, and is also supported by the square rod 29 so that the rod may oscillate therein. By means of this hand-lever, the rod can be oscillated and held in any point of its movement by the lever engaging the toothed segment. To the square rod 29 are secured three arms 33, one located in rear of each of the furrow openers. A rod 34 has its upper end pivotally connected to the free end of the arm 33 and its lower end passes through an opening in the extension 23 through the projecting end of which is passed a pin 35.

Two angle iron bars 36 and 37 are located in the upper face of the projections 23, and the rods 34 passing through them. The inner ends of these bars overlap, and the center rod passes through both. Coiled springs 38 surround the rods 34 and have their upper ends bearing against collars 39 adjustably supported by the rods 34 and their lower ends resting on the angle iron bars 36 and 37. The action of these springs is to hold the angle iron bars yieldingly on the extensions 23. Each of the arms 33 is formed with an upwardly extending rib 40 which lies beneath the extension 15 of the seed box. As the square rod 29 is oscillated in a direction to raise the furrow openers by means of the hand-lever 31, the rib or cam 40 contacts with the projection thereby raising the seed boxes and raising the bevel gears 13 free of the bevel gears 10, and stopping the action of the seed dropping mechanism. To the bars 36 and 37 are connected frames 41 which support a covering wheel 42. A cross-bar 43 connects the bars constituting the frame 41. A rod 44 has a connection with the arm 33 and passes through the cross-bar 43. A coiled spring 45 surrounds the rod 44 and one end rests against the collar 46, and its other end against the cross-bar 43. The action of this spring is to hold the covering wheels downwardly in a yieldable manner. By joining the bars 26 and 27 and the angle iron bars 36 and 37 to the center furrow opener, and pivotally connecting the furrow openers to the main frame, each pair of furrow openers and covering wheels are capable of independent vertical movements, and these bars serve to hold the covering wheels in alinement with the furrow openers.

I claim as my invention:

1. In a corn planter, the combination of a main frame, wheels supporting the main frame, a plurality of seed dropping devices supported by the main frame, a furrow opener for each seed dropping device having a pivotal connection with the main frame, and a transverse bar other than the main frame bars having a pivotal connection with the furrow opener for holding them separated and permitting of their independent vertical movement.

2. In a corn planter, the combination of a main frame, wheels supporting the main frame, a plurality of seed dropping devices supported by the main frame, a furrow opener for each seed dropping device having a pivotal connection with the main frame, a spring engagement for holding each furrow opener downward in a yielding manner, and a transverse bar other than the main frame bars having a pivotal connection with the furrow openers for holding them separated and permitting of their independent vertical movement.

3. In a corn planter, the combination of a main frame, wheels supporting the main frame, a plurality of seed dropping devices supported by the main frame, a furrow opener for each seed dropping device having a pivotal connection with the main frame, two transverse bars located below the main frame and each having a pivotal connection with the furrow openers independently of the main frame for holding them separated and permitting of their independent vertical movement, covering frames pivotally connected to one of the bars, and a wheel supported by each covering frame.

4. In a corn planter, the combination of a main frame, wheels supporting the main frame, a plurality of seed dropping devices supported by the main frame, a furrow opener for each seed dropping device having a pivotal connection with the main frame, two bars, each having a pivotal connection with the furrow openers independently of the main frame for holding them separated and permitting of their independent vertical movement, covering frames pivotally connected to one of the bars, a wheel supported by each covering frame, and spring devices for holding each opener and each covering wheel downward in a yielding manner.

5. In a corn planter, the combination of a main frame, wheels supporting the main frame, three dropping seed devices supported by the main frame, a furrow opener for each seed dropping device independently pivoted to the main frame, four bars in pairs connecting the three furrow openers, each pair having their inner ends pivotally connected to the center furrow opener frame and their outer ends pivotally connected to the outer furrow openers, covering frames pivotally connected to one pair of bars, a wheel for each covering frame, and spring devices for holding each furrow opener and each covering wheel downward in a yielding manner.

6. In a corn planter, the combination with a main frame, of a plurality of seeding devices pivotally connected thereto, and transverse separator bars other than the main frame bars pivoted together on one of the intermediate devices and pivoted to the other devices to permit said devices to independently move in a vertical direction.

7. In a corn planter, the combination with a main frame, of a plurality of seeding devices pivotally connected thereto, transverse separator bars independent of the main frame and pivotally connected to the seeding devices, and covering means pivotally connected to the separator bars.

8. In a corn planter, the combination with a main frame having a guideway and an elevated seat at one side of the guideway, of a seed box pivotally mounted in the main frame for vertical movement and being also capable of lateral movement, and a projection carried by the seed box and normally engaged in the guide of the frame, said projection being movable laterally with the seed box to a position on the seat when disengaged from the guideway.

In testimony whereof I have hereunto set my hand in presence of two subscribing witnesses.

LEWIS E. WATERMAN.

Witnesses:
A. O. BEHEL,
E. D. E. N. BEHEL.